(12) United States Patent
Lynn et al.

(10) Patent No.: US 6,238,443 B1
(45) Date of Patent: May 29, 2001

(54) PROCESS OF AGGLOMERATING HIGH CARBON DUSTS AND A SUBSTANTIALLY NON-DUSTING HIGH CARBON COMPOSITION THEREFROM

(75) Inventors: John D. Lynn, Center Valley, PA (US); Colvin W. Smith, Catonsville; Marvin S. Stern, Timonium, both of MD (US)

(73) Assignee: Bethlehem Steel Corporation, DE (US)

( * ) Notice: Subject to any disclaimer, the term of this patent is extended or adjusted under 35 U.S.C. 154(b) by 0 days.

(21) Appl. No.: 09/364,445

(22) Filed: Jul. 30, 1999

(51) Int. Cl.[7] ............................... C09C 1/58; C09C 1/59
(52) U.S. Cl. .................. 23/314; 423/445 R; 423/449.2; 423/460; 423/461
(58) Field of Search .................... 23/313 R, 314; 423/445 R, 448, 449.1, 449.2, 449.8, 460, 461; 264/117

(56) References Cited

U.S. PATENT DOCUMENTS

| | | | |
|---|---|---|---|
| 3,901,823 | 8/1975 | Dimitri et al. | 264/117 |
| 3,932,596 | 1/1976 | Rohatgi | 423/448 |
| 5,364,441 | 11/1994 | Worner | 75/10.1 |
| 5,531,805 | 7/1996 | Worner | 75/10.63 |
| 5,560,892 | 10/1996 | Bennett et al. | 422/267 |
| 5,672,327 | 9/1997 | Bennett et al. | 423/488 |

OTHER PUBLICATIONS

Browning, "Agglomeration: Growing Larger in Applications Technology", Chemical Engineering. Dec. 4, 1967. pp. 147–169.

Perry's Chemical Engineering Handbook, 7th edition. p. 19–20.

*Primary Examiner*—Steven P. Griffin
*Assistant Examiner*—Maribel Medina

(57) ABSTRACT

The invention is directed to a process for agglomerating high-carbon dust, such as kish. The process comprises the steps of providing a supply of the high-carbon dust, applying a suifactant and water to the high-carbon dust, and applying a bonding agent to the high-carbon dust so that the high-carbon dust becomes agglomerated. The process provides a product having favorable characteristics. A substantially non-dusting high-carbon composition, for example, can be provided. The high-carbon composition comprises high-carbon dust, a surfactant, and a bonding agent in an amount by weight between about $\frac{1}{20{,}000}$ and about $\frac{1}{200}$ of the weight of the high-carbon dust. The high-carbon dust, surfactant, and bonding agent are agglomerated to form a clay-like material. A kish agglomerating system also is provided. The system comprises a kish storage container, a mixing tank, and a transport mechanism. The mixing tank has an agitator adapted to mix kish, surfactant and bonding agent so that the kish, surfactant and bonding agent become agglomerated. Also provided is a kish collection and treatment vessel. The vessel comprises a wall structure, a closure device, and a treatment applicator. The wall structure defines outer boundaries of a kish collection cavity. The treatment applicator has an inlet outside of the kish collection cavity and at least one outlet in communication with the kish collection cavity to permit treatment of any kish in the kish collection cavity even when the closure device is in the closed position.

35 Claims, 4 Drawing Sheets

PROCESS OF AGGLOMERATING HIGH CARBON DUSTS AND A SUBSTANTIALLY NON-DUSTING HIGH CARBON COMPOSITION THEREFROM

FIELD OF THE INVENTION

This invention is directed to a process of agglomerating high-carbon dusts, such as kish, a product of the process, and a substantially non-dusting, high-carbon composition.

BACKGROUND OF THE INVENTION

Kish refers generally to carbon material that collects at the surface of molten iron (hot metal) from a blast furnace after casting. At casting temperatures, the liquid iron is saturated with dissolved carbon. As the iron cools, it becomes supersaturated with carbon. The carbon comes out of the iron solution as flakes of graphite. Graphite is a soft mineral that occurs as thin plates and is composed of pure carbon. The longer the hot metal cools, the greater the yield of graphite flakes.

In BOF (basic oxygen furnace) steelmaking operations, kish is also produced during the steps of reladling, desulphurization of the hot metal, slag skimming, and ladle treatment. Kish produced during these steps is collected as baghouse dust and varies in quantity and composition. At Bethlehem Steel Corporation's Sparrows Point facility in Maryland, for example, the quantity of kish materials collected as baghouse dust is significant. The following Table-A shows the quantity of kish material collected as baghouse dust during each step at the Sparrows Point facility.

TABLE-A

| Step in BOF Steelmaking | Quantity of Kish Dusts |
| --- | --- |
| BOF Reladling | 1,270 tons per year |
| BOF Desulphurization | 240 tons per year |
| BOF Slag Skimming | 160 tons per year |
| BOF Ladle Treatment | 200 tons per year |
| Total | 1,870 tons per year |

The kish collected at the Sparrows Point facility was analyzed to determine its chemical and physical properties. In addition, the U.S. Bureau of Mines (USBM) studied the possibility of recovering high purity graphite from kish. See e.g., Nicks L. J., et al., Recovering Flake Graphite from Steelmaking Kish, Journal of Mining, June 1995. According to the USBM, the study was motivated, at least in part, because graphite is a strategic mineral for which there is no domestic supply. The kish sample in the USBM study, like the sample collected at the Sparrows Point facility, was analyzed to determine its chemical properties.

The following Table-B lists the results of the chemical and physical property analyses of the samples taken from the Sparrows Point facility, as well as the results of the chemical analysis conducted on the USBM sample. The data in Table-B demonstrates that there is a high degree of variability associated with the samples, particularly with the carbon content of the samples. The carbon content reflects the amount of graphite present in the kish samples. The amount of graphite is sufficient to make it desirable to subject the kish to beneficiation and/or chemical treatment to recover pure graphite for commercial use. Beneficiation and/or chemical treatment, however, require handling of the kish.

TABLE B

CHEMICAL AND PHYSICAL ANALYSIS OF STEELMAKING KISH

| | USBM | Sparrows Point Kish Samples | | | |
| --- | --- | --- | --- | --- | --- |
| Constituent | Kish | BOF Related | | Desulphurizer | | Skimmer |
| % dry basis | Sample | 1999 | 1986 | 1999 | 1986 | 1999 |
| $Fe^{Total}$ | 56.2 | 57.5 | 51.1 | 38.4 | 23.6 | 48.2 |
| C | 15.6 | 17.7 | 24.8 | 38.7 | 25.1 | 29.8 |
| S | 3.9 | 0.05 | 0.04 | 0.28 | 1.19 | 0.05 |
| P | na | 0.30 | na | 0.05 | 0.01 | 0.05 |
| Zn | " | na | 0.07 | 0.30 | 0.37 | na |
| $Na_2O$ | " | " | 0.05 | na | 0.36 | " |
| $K_2O$ | " | " | 0.05 | " | 0.35 | " |
| $SiO_2$ | 9.5 | 0.90 | 1.20 | 1.40 | 0.97 | 1.1 |
| CaO | 10 | na | 0.14 | na | 20.2 | na |
| MgO | 2.8 | " | 0.06 | " | 12.1 | " |
| $Al_2O_3$ | 1.5 | " | 0.19 | " | 0.30 | " |
| Mn | na | 0.3 | 0.9 | 0.30 | na | 0.3 |

Physical Properties
Size Analysis % Retained

| | | | |
| --- | --- | --- | --- |
| +48 Mesh | 4.7 | 9.4 | 14.7 |
| +65 Mesh | 6.9 | 9.0 | 8.7 |
| +100 Mesh | 11.5 | 14.3 | 10.9 |
| +150 Mesh | 10.6 | 9.6 | 9.1 |
| +200 Mesh | 7.9 | 6.9 | 5.9 |
| +325 Mesh | 9.3 | 8.7 | 7.2 |
| +400 Mesh | 2.7 | 2.4 | 2.4 |
| +500 Mesh | 5.0 | 4.2 | 4.0 |
| −500 Mesh | 41.4 | 35.5 | 36.1 |
| Bulk Density, lbs/cf before and after treatment | 56/104 | 47/102 | |

Even disposal of the kish, recycling or other treatment, requires some handling. The kish dust, however, is difficult to handle. The kish dust is dry and and contains an ultra fine component.

The distribution of particle sizes of the kish dust is shown in Table-B. Notably, 30 to 40 percent of the kish has a particle size less than 25 micron. High-carbon dust with a particle size greater than 10 microns exhibits a tendency to settle to the ground in ambient air. Part of the kish, however, has a particle size smaller than 10 microns. Particle sizes between about 1 and 10 microns exhibit a resistance to settling both in ambient air and water that increases as the particle size decreases. Below a particle size of about 1 micron, a significant amount of the kish dust remains airborne and does not settle. Thus, part of the kish dust is so fine that it tends to remain airborne. This makes it easy for wind to carry the kish dust far from the source of kish, especially during handling where the dust may become agitated during handling and disposal. An area surrounding the source of kish therefore becomes susceptible to contamination, especially if attempts are made to handle or transport the kish for recycling, beneficiation, and/or disposal.

The tendency for the kish to contaminate surrounding areas is exacerbated by its physical properties. The graphite contained in the kish dust exhibits hydrophobic properties. The hydrophobic properties inhibit wetting. When attempts are made to contain the dust by applying water to the dry kish, the kish dust floats on the water. Water application therefore falls well short of alleviating the dustiness and difficulties associated with handling of the kish. It also falls well short of alleviating the problem of environmental contamination.

In view of the hydrophobic properties of the graphite, attempts have been made to apply a surface active agent (i.e., a surfactant) to the kish, in order to provide a wetting agent along with the water. See e.g., U.S. Pat. No. 3,932,596 to Rohatgi, assigned to the assignee hereof. While those attempts were successful to some extent at containing the kish temporarily, eventually the resulting combination of kish, water, and surfactant would dry. When it dried, the kish again became dusty, and was able to contaminate the surrounding area.

The potential for contamination, however, is not the only disadvantage of the prior techniques. The difficulty associated with handling of the kish and its tendency to become airborne during handling has a negative impact on the recovery of commercially valuable material, such as graphite, from the kish. In particular, the loss of kish dust into the air reduces the total amount of material that can be recovered from the kish.

There is consequently a need in the art for a way of agglomerating the kish, so that it can be handled and/or stored with little, if any, of the kish contaminating or becoming suspended in the surrounding air. A need also exists for a kish product that can be transported easily for recycling, beneficiation, and/or disposal, with little or no contamination of the surrounding air. A need also exists for a way of preventing the agglomerated kish from becoming dusty after it dries. Since the high-carbon dust that makes up the kish may include materials that have commercial value, such as graphite, there is a need for a high-carbon composition which is derived from the kish and which can be handled and/or treated to recover such materials.

SUMMARY OF THE INVENTION

A primary object of the present invention is to overcome at least one of the foregoing problems and/or satisfy at least one of the foregoing needs by providing a process of agglomerating high-carbon dusts, such as kish. Another object of the present invention is to provide a high-carbon composition produced by the process.

To achieve these and/or other objects, the present invention provides a process of agglomerating high-carbon dust. The process comprises the steps of providing a supply of high-carbon dust, applying a surfactant and water to the high-carbon dust, and applying a bonding agent to the high-carbon dust so that the high-carbon dust becomes agglomerated. A product of the process also is provided by the present invention.

The present invention also provides a process of agglomerating kish. The process comprises the steps of providing a supply of kish, applying a surfactant to the kish, applying a wetting agent to the kish, and applying a bonding agent to the kish so that the kish becomes agglomerated. A product of the process also is provided by the present invention.

Also provided by the present invention is a substantially non-dusting high-carbon composition. The high-carbon composition comprises high-carbon dust, a surfactant, and a bonding agent in an amount by weight between about $1/20,000$ and about $1/200$ of the weight of the high-carbon dust. The high-carbon dust, surfactant, and bonding agent are agglomerated to form a clay-like material.

The present invention also provides a kish agglomerating system. The system comprises a kish storage container, a mixing tank, and a transport mechanism. The mixing tank is connected at least indirectly to the kish storage container and is adapted to receive a suifactant and a bonding agent, as well as the kish from the kish storage container. The mixing tank has an agitator adapted to mix the kish, surfactant and bonding agent so that the kish, surfactant and bonding agent become agglomerated. The transport mechanism is adapted to transport the kish, surfactant and bonding agent, in an agglomerated form, out of the mixing tank.

Also provided by the present invention is a kish collection and treatment vessel. The vessel comprises a wall structure, a closure device, and a treatment applicator. The wall structure defines outer boundaries of a kish collection cavity. The closure device is located at the wall structure. The closure device is movable between a closed position wherein external access to the kish collection cavity is precluded, and an open position wherein the kish collection cavity is open. The treatment applicator has an inlet outside of the kish collection cavity and at least one outlet in communication with the kish collection cavity to permit treatment of any kish in the kish collection cavity even when the closure device is in the closed position. The above and other objects and advantages will become more readily apparent when reference is made to the following description taken in conjunction with the accompanying drawings.

DETAILED DESCRIPTION OF THE PREFERRED EMBODIMENT

Figure 1:
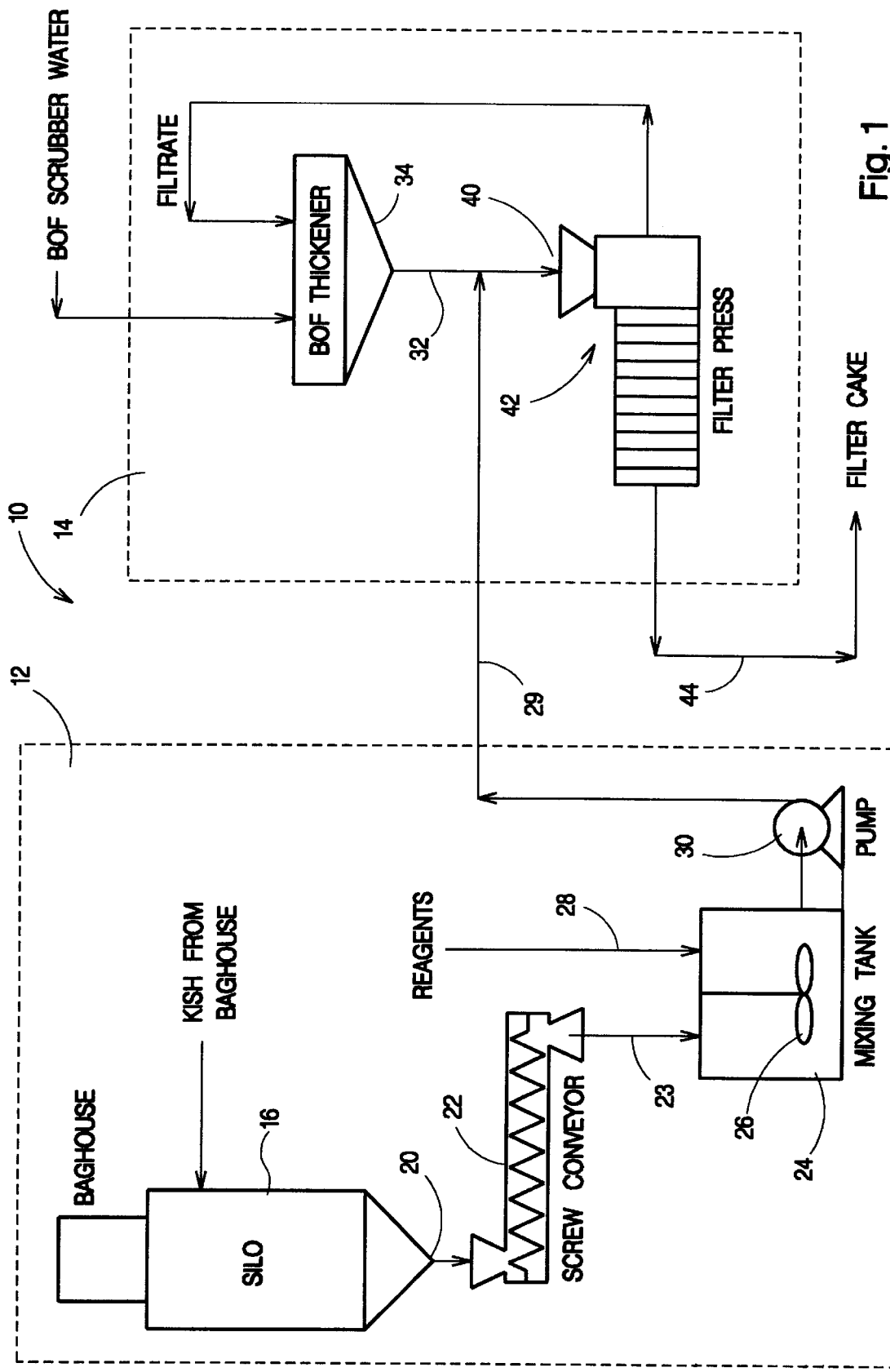
FIG. 1. is a schematic process diagram of a recycling system according to a preferred implementation of the present invention.

A preferred implementation of the present invention is a process of agglomerating high-carbon dust. Examples of the high-carbon dust include kish generated during steelmaking and iron making operations. The agglomerating process includes the steps of providing a supply of high-carbon dust (e.g., kish), applying water (or other suitable liquid) and a surfactant to the high-carbon dust, and applying a bonding agent to the high-carbon dust so that the high-carbon dust becomes agglomerated. The water surfactant, and bonding agent may be applied in a single treatment step in the form of a solution.

The surfactant can be any suitable surface active agent, such as commercially available detergents. Suitable commercially available surfactants include American Cyanamid Aerosol OT and BetzDearborn DC 9119.

The application of the surfactant and bonding agent can be performed in successive steps or simultaneously. The bonding agent preferably is applied in an aqueous solution. Preferably, the bonding agent represents about 0.5 weight percent to about 1.0 weight percent of the aqueous solution. Dilution of the bonding agent makes handling easier and improves the bonding reaction with ultra fine graphite particles. Preferably, about 0.1 to 1.0 pound of the bonding agent is applied for every ton of kish.

The resulting mixture of kish, surfactant, and bonding agent in an aqueous solution alters the surface properties of graphite particles in the kish and allows wetting and agglomeration of the graphite particles to occur. The graphite particles thus become hydrophilic and more amenable to further processing of the kish, such as recycling and/or beneficiation and recovery of the graphite contained therein.

The bonding agent can be organic or inorganic. An exemplary inorganic bonding agent is sodium silicate. As a bonding agent, the sodium silicate causes the mixture of kish, surfactant, and bonding agent to agglomerate into a clay-like material. For purposes of this disclosure, the term "clay-like material" refers to a material having the texture, consistency, and general mechanical properties of clay. In this regard, clay-like materials are spreadable and moldable, having a consistency much like soil. The sodium silicate advantageously resists drying out of the agglomeration. The resulting agglomeration therefore retains the kish and prevents it from dusting off and becoming airborne. Advantageously, even after the agglomeration is allowed to dry, the resulting material is a non-dusting, granular material. Another exemplary silicate type inorganic bonding agent is bentonite.

Alternatively, the bonding agent can be an organic bonding agent, such as lignin. Organic bonding agents can be stripped, for example, by applying heat and/or solvents. Although lignin is volatile and requires careful handling, it can be stripped from the resulting product when it arrives at a recycling or material recovery site. The recovery of certain materials, such as graphite, from the agglomerated product therefore may be facilitated by use of lignin or other organic bonding agents instead of the exemplary or other inorganic bonding agents. Generally, inorganic bonding agents, such as the exemplary sodium silicate, are preferred where a strong bond is desired, for example, in high temperature applications of the process and its product. It is understood, however, that the choice between using an inorganic bonding agent and using an organic bonding agent will depend to some extent on the particular applications, materials, and environment of the process. The choice among the various bonding agents within each group also will depend on what characteristics are desired in the bonding agent for the particular application.

The process advantageously can be implemented using kish or other high-carbon dust, having particle sizes of less than about 10 micron. Preferably, the kish or other high-carbon dust includes particle sizes of about 1 to 10 microns. This is the range of particles sizes where resistance to settling begins to manifest itself.

When the temperature of the dust, surfactant, and/or bonding agent is expected to drop below freezing, the process may also include the step of applying an anti-freeze agent to the high-carbon dust, before, during or after application of the surfactant, water, and bonding agent. An exemplary anti-freeze agent is calcium chloride.

A substantially non-dusting high-carbon composition can be provided using the exemplary implementation of the process described above. The resulting high carbon composition includes the kish, the surfactant, and the bonding agent. The high-carbon dust, surfactant, and bonding agent are agglomerated to form a clay-like material. The bonding agent preferably is included in an amount by weight between about 1/20,000 and about 1/200 of the weight of the high-carbon dust. The resulting composition preferably includes water in an amount by weight between about 100 and 200 times the weight of the bonding agent. The bonding agent and surfactant can include any of the aforementioned examples of the bonding agent and surfactant, or can include alternatives thereof. The high-carbon composition also may include the aforementioned or alternative anti-freeze agents.

Testing of the process has revealed that, after spraying the kish with an aqueous solution of surfactant and bonding agent, the desired agglomeration can be achieved within about 16 to 24 hours, independently of temperature. This time was found to be sufficient to achieve wetting and agglomeration of the ultra fine particles in the kish (30 to 40 percent of which have a particle size less than 25 microns). It is believed that, because of the fineness of the particles that make up the kish, percolation and reaction bonding of the high surface area particles is time dependent.

There are ways, however, to expedite the percolation and reaction times. Mechanical agitation, for example, can reduce the reaction time to less than one hour, especially if it becomes desirable to recycle or otherwise use the treated kish soon after application of the bonding agent and surfactant.

In this regard, FIG. 1 is a schematic process diagram of a recycling system 10 that uses mechanical agitation to hasten the percolation and reaction process. The recycling system 10 includes a kish agglomerating system 12 and an agglomerated kish recycling portion 14.

In the exemplary kish agglomerating system 12, the kish from a baghouse is stored in a kish silo 16 (or similar kish storage container). The output 20 of the kish silo 16 is connected to a screw conveyor 22. The screw conveyor 22 feeds the raw kish 23 into a mixing tank 24. The mixing tank 24 includes an agitator 26. Though the agitator 26 is schematically represented, it is understood that many different agitator configurations will suffice. In the mixing tank 24, the surfactant, the bonding agent, and water (reagents 28) are applied to the raw kish 23, and the agitator 26 is activated to provide mechanical agitation and mixing of the surfactant and bonding agent (reagents 28), into the kish 23. The mechanical agitation expedites the percolation and reaction process. The reagents 28 can be applied using any of the aforementioned exemplary suifactants and bonding agents, in any desired sequence. Water also can be added to one or both of the agents prior to mixing (to provide an aqueous solution containing the agent(s)) and/or can be added directly to the kish 23 while the surfactant and bonding agent are applied or thereafter. When the mixing results in sufficient agglomeration of the kish 23, the agglomerated kish 29 is pumped, by a pumping mechanism 30 (or other transport mechanism), out of the mixing tank 24 and into the kish recycling portion 14.

In the exemplary kish recycling portion 14, the agglomerated kish 29 is mixed with the output 32 from a basic oxygen furnace ("BOF") thickener 34. The output 32 and the agglomerated kish 29 are communicated to the inlet 40 of a filter or filter bank 42. The material that is unable to pass through the filter or filter bank 42 forms a filter cake 44. The resulting filter cake 44 can be recycled by adding it to the BOF as a substitute coolant in place of iron ore. Preferably, the amount of agglomerated kish 29 mixed with the output 32 of the BOF thickener system 34 represents about 5% or less of the weight of the resulting filter cake. While the agglomerated kish 29 has a residual moisture of about 60 percent to 70 percent as it exits the mixing tank 24, its addition to the filter feed advantageously reduces the water content to a desirable range of about 25 percent to about 35 percent.

Alternatives to the exemplary kish recycling portion 14 can be provided. The agglomerated kish 29, for example, can be added as a feed material to a sinter plant. In the past, it was believed that the handling and dusting problems associated with raw kish precluded the kish from being used as part of the sinter burden in most, if not all, practical applications. Since the agglomerated kish 29 provided by the foregoing exemplary process avoids or significantly reduces the dusting and handling problems, the agglomerated kish 29 can be readily added to the bedding pile to become part of the sinter plant feedstock. Notably, standard handling and blending procedures used at the sinter plant revert handling and bedding operations can be used with the agglomerated kish 29.

While the exemplary mixing tank 24 includes an agitator 26 adapted to expedite the percolation and bonding reaction that provide the agglomerated kish 29, it is understood that the mechanical agitation need not be provided, especially in situations where the percolation and reaction times are consistent with the frequency of disposal, handling, or transport of the agglomerated kish 29.

In steel plants, for example, the rate at which kish is collected in baghouses is relatively slow. In most cases, the baghouse dust is disposed of once per day. There is consequently little, if any, need to expedite the bonding reaction time. Instead, it is generally more desirable to avoid any complexities or expenses associated with agitation by storing the kish long enough after application of the reagents for the percolation and reaction to naturally occur. Advantageously, this simplifies the overall operation and requires little, if any, additional equipment.

Preferably, application of the reagents is performed in the same collection vessel that receives the kish from the baghouse. Since sufficient agglomeration can take between 16 and 24 hours, it is desirable to provide two collection vessels. One vessel is kept at the output from the baghouse to collect kish throughout the day. When the first vessel is full, it is replaced by the second vessel. The first vessel continues to hold the kish while it is treated with the aforementioned reagents and agglomerates. During this agglomeration period, the second vessel collects and stores the kish from the baghouse. After agglomeration occurs in the first vessel, the first vessel is emptied (i.e., the agglomerated kish 29 is removed for disposal, recycling, beneficiation, and/or recovery of valuable materials, such as graphite) and is brought back to replace the second vessel. The second vessel then has its contents treated with same reagents. This process of cycling the first and second vessels between collection and treatment shifts provides a convenient way of collecting and agglomerating the kish.

Figure 3:
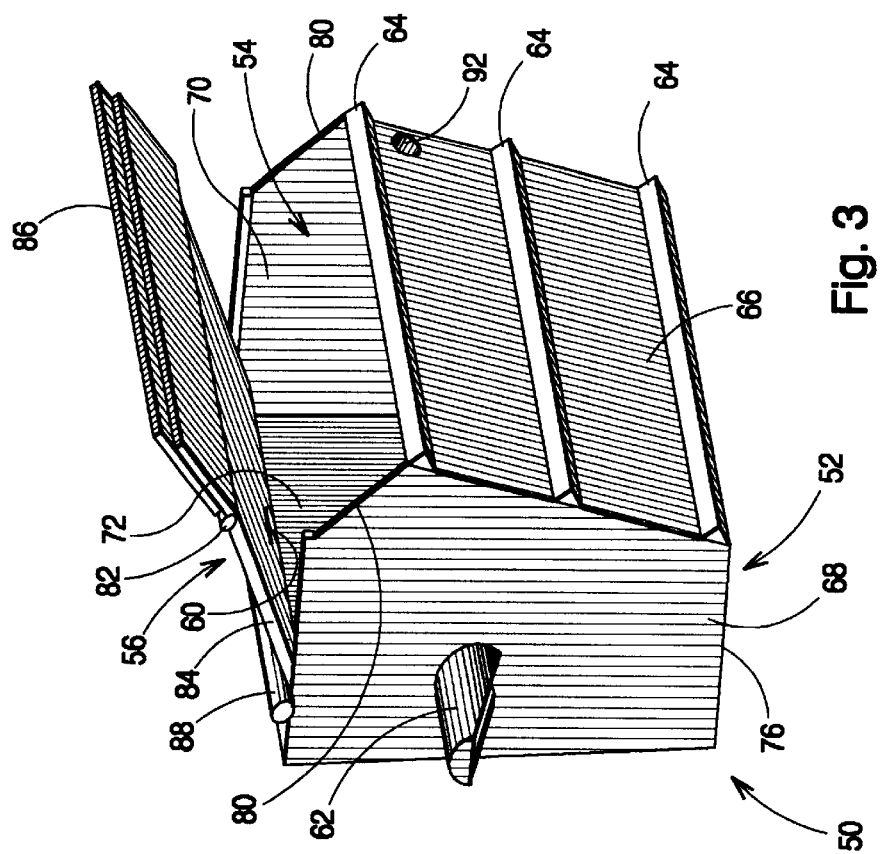
FIG. 3. is a perspective view of the vessel shown in FIG. 2.

With reference to FIGS. 2–7, each vessel 50 includes a wall structure 52 defining outer boundaries of a kish collection cavity 54, a closure device 56 at the wall structure 52, and a treatment applicator 58. The closure device 56 preferably is defined by a pivoted lid 56. A kish input opening 60 as best shown in FIG. 3 in the pivoted lid 56 can be connected to the output from a baghouse, so that kish from the baghouse is sent directly into the kish collection cavity 54.

The pivoted lid 56 is movable between a closed position (shown in FIGS. 2 and 5–7) wherein exposure of the kish collection cavity 54 is precluded, and an open position (shown in FIGS. 3 and 4) wherein the kish collection cavity 54 is open, to permit emptying of the kish collection cavity 54.

Figure 4:
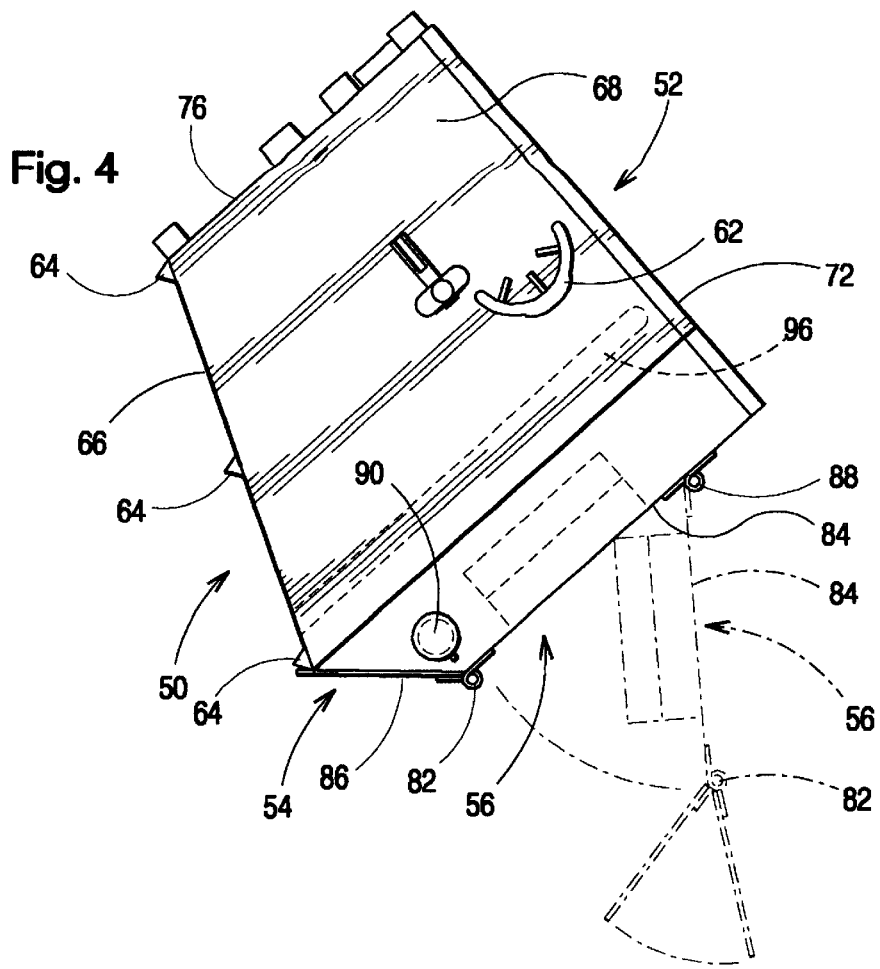
FIG. 4. is a side view of the vessel shown in FIGS. 2 and 3 when the vessel is tilted for emptying.
Figure 5:
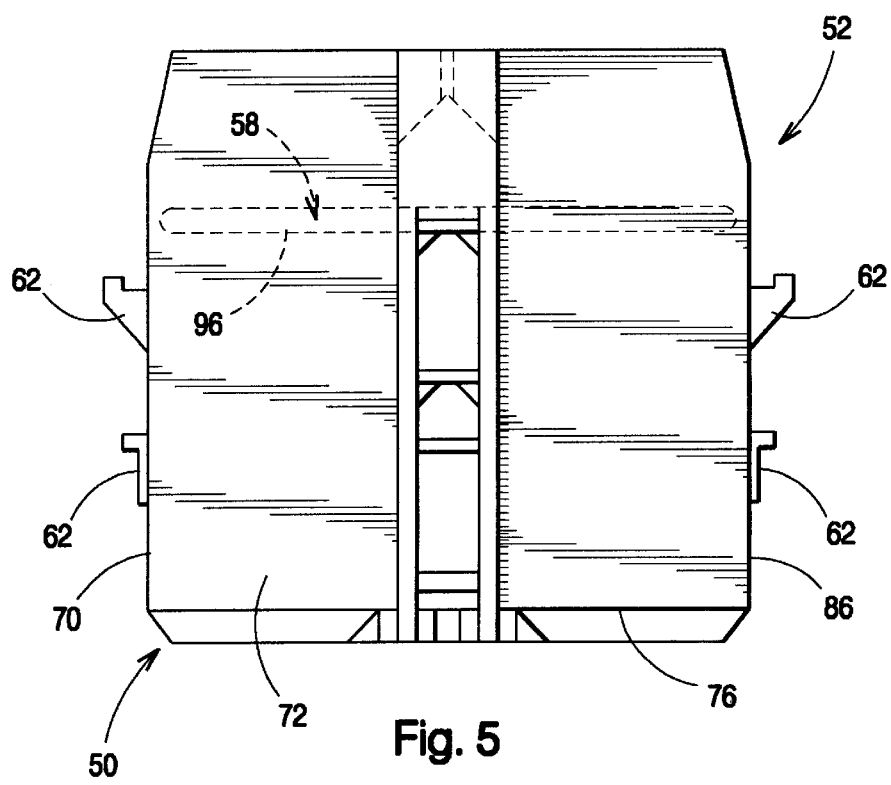
FIG. 5. is a rear view of the vessel shown in FIGS. 2–4.

As best shown in FIG. 4, when emptying of the kish collection cavity 54 is desired, the vessel 50 is tipped over using suitable machinery, and gravity causes the pivoted lid 56 to open automatically. Gravity also causes the contents of the kish collection cavity 54 to fall out. Rails 62 are provided on the wall structure 52, and can be engaged by suitable loading/unloading machinery to lift and tip the vessel 50.

The exemplary wall structure 52 can be reinforced using ribs 64 or otherwise. In the exemplary embodiment, only the front wall 66 is reinforced with ribs 64. Additional reinforcement, however, can be provided.

The exemplary wall structure 52 has side walls 68,70 that are generally orthogonal with respect to the back wall 72. The side walls 68,70 and the back wall 72 are substantially vertical when the vessel 50 has its bottom wall 76 resting on the ground. The front wall 66 of the exemplary wall structure 52, however, is not vertical. Instead, it projects from the bottom wall 76 in a generally forward direction. The front wall 66 thus forms an obtuse angle A (shown in FIG. 2) with respect to the bottom wall 76. It also does not extend as high as the back wall 72 and side walls 68,70.

Each side wall 68,70 thus has a pentagonal shape, one edge 80 of which is much shorter than the others. The edges 80 are perhaps best illustrated in FIG. 3. In addition, the pivoted lid 56 has a supplemental pivot joint 82. The supplemental pivot joint 82 hingedly connects two panels 84,86 of the lid 56. One panel 86 extends a much shorter distance from the supplemental joint 82 than the other panel 84. This shorter distance corresponds to the length of the shortest edge 80 of the pentagonally shaped side walls 68,70. The resulting lid structure allows viewing of, and limited access to, the kish collection cavity 52 by merely pivoting only the smaller panel 86 with respect to the supplemental joint 82. This is much easier than pivoting the entire lid 56 about its pivot axis 88.

Figure 6:
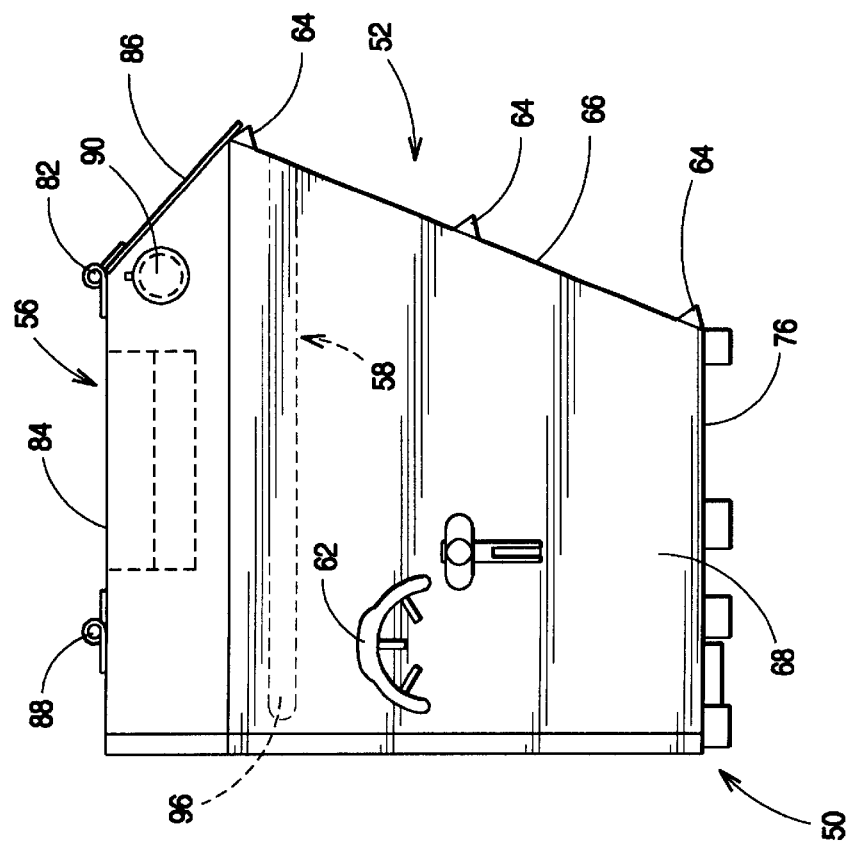
FIG. 6. is a side view of the vessel shown in FIGS. 2–5.

As shown in FIGS. 4 and 6, one or more lid stops 90 can be provided at the side walls 68,70, to support the supplemental pivot joint 82 when the lid 56 is closed. The lid 56 thus conforms to the general shape of the side walls 68,70 when in the closed position.

Figure 2:
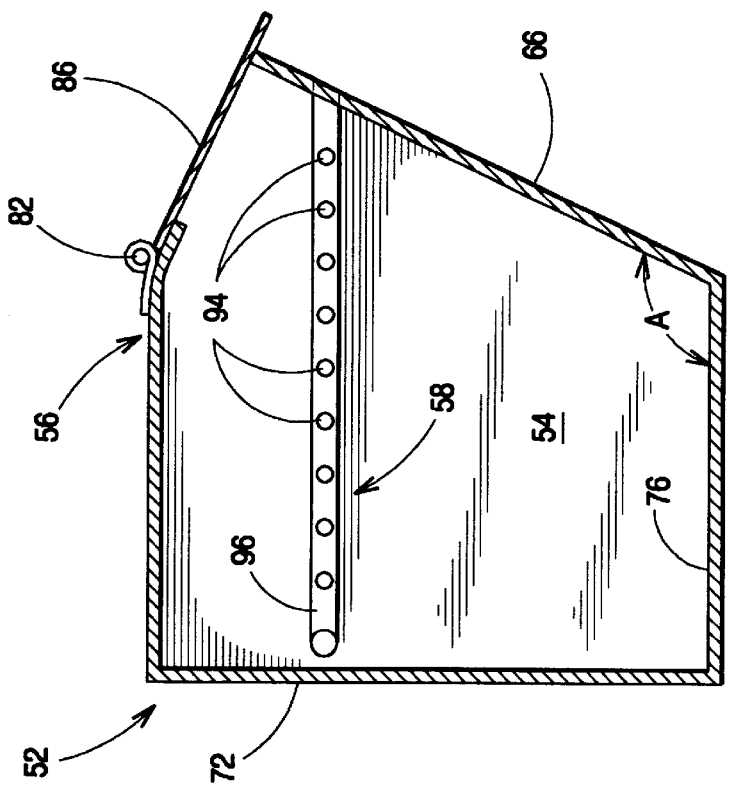
FIG. 2. is a cross-sectional view, taken along line 3—3 in FIG. 7, of a kish collection and treatment vessel according to a preferred embodiment of the present invention.
Figure 7:
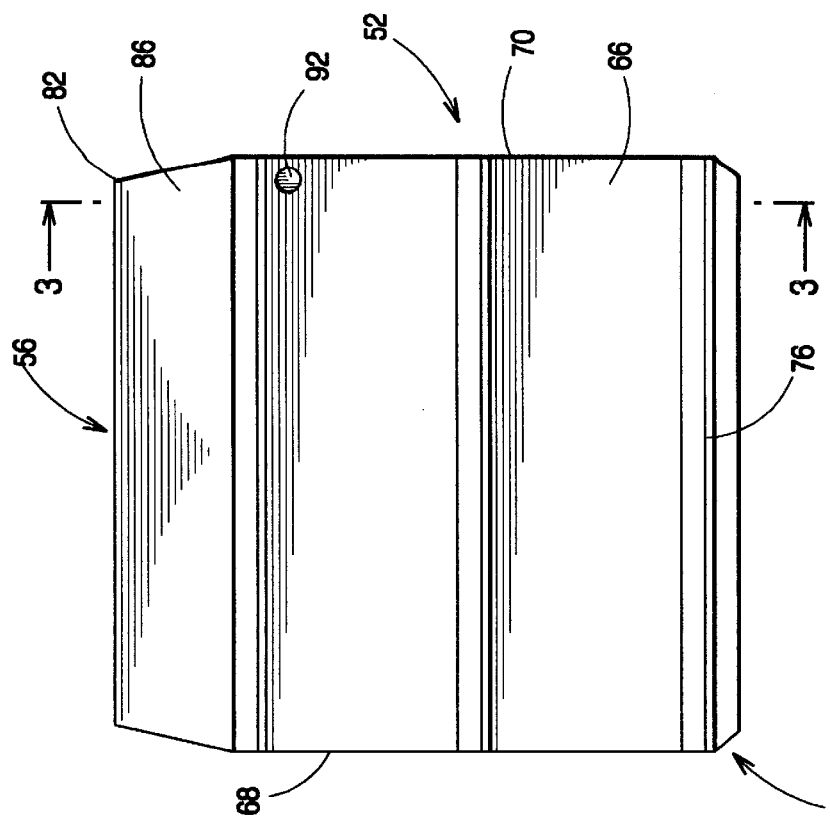
FIG. 7. is a front view of the vessel shown in FIGS. 2–6.

The treatment applicator 58 has an inlet 92, as best shown in FIG. 7 and at least one outlet 94 shown in FIG. 2 in communication with the kish collection cavity 52 to permit treatment of any kish in the kish collection cavity 52, even when the closure device 56 is in the closed position. Preferably, the treatment applicator 58 includes numerous outlets 94 adapted to apply the aforementioned reagents in a relatively uniform manner over the kish collection cavity 54. The exemplary treatment applicator 58 includes an elongated reagent pipe 96 that extends horizontally along the side walls 68,70 and the back wall 72. The reagent pipe 96 has outlets 94 spaced substantially equidistant from one another along the length of the pipe 96. Ten of the outlets 94 are visible in FIG. 2. All of the agglomeration treatment process therefore can be carried out without having to open the vessel 50. Those skilled in the art recognize that the reagents will be remote from vessel 50, and will be suppled to pipe 96 through pumps or the like communicating with inlet 92.

A primary advantage of the foregoing processes, products, and systems is that they facilitate or provide a way of agglomerating the kish so that it can be handled and/or stored with little, if any, of the kish contaminating or becoming suspended in the surrounding air. The agglomerated kish product then can be transported easily for recycling, beneficiation, and/or disposal, with little or no contamination of the surrounding air. The agglomerated kish advantageously is prevented from becoming dusty after it dries.

As shown in Table-B, the overall volume of the kish decreases and the bulk density increases, in response to the agglomeration process. The bulk density of the BOF reladling kish sample taken from Sparrows Point, for example, increased from 56 pounds per cubic foot to 104 pounds per cubic foot. Similarly, the bulk density of the samples taken from the desulphurizer kish and skimmer kish increased from 47 pounds per cubic foot to 102 pounds per cubic foot, and from 39 pounds per cubit foot to 70 pounds per cubic foot, respectively. Since landfill and transportation costs are based principally on volume, the increased bulk density translates into significant savings in disposal and transportation costs. The increased bulk density also translates into conservation of existing landfill space—a worthy endeavor in view of recent shortages.

Since the high-carbon dust that makes up the kish may include materials that have commercial value, such as graphite, the foregoing processes, products, and systems advantageously provide a high-carbon composition which is derived from the kish and which can be handled and/or treated to recover such materials.

The desirability of recovering high-purity graphite from kish has been well documented, for example, by the USBM. High-purity graphite can be used in refractories and crucibles used in steelmaking, as a lubricant, in brake linings, for electric motor brushes, and in batteries. Bethlehem Steel Corporation's Sparrows Point facility, for example, generates about 2,000 tons per year of kish in its baghouses. If one assumes that about 50 percent of that kish is graphite, then 1,000 tons per year of graphite is potentially recoverable from the Sparrows Point facility alone. For the steel industry as a whole, it is estimated that this represents about 30,000 tons per year of graphite. Today, most of this graphite is disposed of in landfills because of the difficulties associated with handling the kish, which difficulties are substantially eliminated by the foregoing processes, products, and systems.

The present invention therefore facilitates physical beneficiation of the graphite, followed by chemical purification by acid leaching. In this regard, U.S. Pat. No. 5,560,892 to Bennett et al. is incorporated herein by reference, as is the USBM article, Nicks L. J., et al., Recovering Flake Graphite from Steelmaking Kish, Journal of Mining, June 1995.

According to the technique disclosed in the USBM article, the physical beneficiation is provided by hydraulic classification (e.g., Whirlsizer; Krebs Engineers). More importantly, however, chemical purification is provided by a step of hydrochloric acid leaching and a step of hydrofluoric acid leaching. The results are graphite particles that are 99 percent pure carbon, and granular iron/slag that is about 65 percent iron. The waste products include the hydroxide cake from neutralization of spent HCL, the gypsum cake from HCL regeneration, the fluoride cake (i.e., calcium fluor silicate) from neutralization of spent HF, and the sulfide waste from a vapor scrubber. While the USBM technique can be used, it is understood that the invention is not limited to this recovery technique. Other techniques can be used. High-purity graphite can be recovered either at the steelmaking and/or ironmaking facilities. Alternatively, the agglomerated kisb can be transported to a recovery site, where the high-purity graphite is recovered. The present invention also can be used to provide other value-added products from the kish or other high-carbon dust, which products might otherwise not have been practical but for the agglomeration provided by the invention.

While this invention has been described as having a preferred design and implementation, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A process of agglomerating high-carbon dust, comprising the steps of:
    a) providing a supply of high-carbon dust; and
    b) applying surfactant, water, and a bonding agent to the high-carbon dust so that the high-carbon dust becomes agglomerated to a substantially non-dusting composition, said bonding agent comprising up to about 0.5 wt. % relative to said high-carbon dust.
2. The process of claim 1, wherein said bonding agent is applied in an aqueous solution.
3. The process of claim 2, wherein said bonding agent represents about 0.5 weight percent to about 1.0 weight percent of the aqueous solution.
4. The process of claim 1, wherein the bonding agent is an inorganic bonding agent.
5. The process of claim 4, wherein the inorganic bonding agent is a silicate.
6. The process of claim 4, wherein the inorganic bonding agent is sodium silicate.
7. The process of claim 4, wherein the the inorganic bonding agent is bentonite.
8. The process of claim 1, wherein the bonding agent is an organic bonding agent.
9. The process of claim 8, wherein the organic bonding agent is lignin.
10. The process of claim 1, wherein at least some of said high-carbon dust has a particle size of less than about 10 micron.
11. The process of claim 1, wherein at least some of said high-carbon dust has a particle size between about 1 micron and about 10 micron.
12. The process of claim 1, further comprising the step of applying an anti-freeze agent to the high-carbon dust.
13. The process of claim 1, wherein said bonding agent maintains the high-carbon dust agglomerated as a clay-like material.
14. A process of agglomerating kish, comprising the steps of:
    a) providing a supply of kish;
    b) applying a surfactant to the kish;
    c) applying water to the kish; and
    d) applying a bonding agent to the kish so that the kish becomes agglomerated to a substantially non-dusting composition.
15. The process of claim 14, wherein said bonding agent is applied as an aqueous solution.
16. The process of claim 15, wherein said bonding agent represents about 0.5 weight percent to about 1.0 weight percent of the aqueous solution.
17. The process of claim 14, wherein the bonding agent is an inorganic bonding agent.
18. The process of claim 17, wherein the inorganic bonding agent is a silicate.
19. The process of claim 17, wherein the inorganic bonding agent is sodium silicate.
20. The process of claim 17, wherein the inorganic bonding agent is bentonite.
21. The process of claim 14, wherein the bonding agent is an organic bonding agent.

22. The process of claim 21, wherein the organic bonding agent is lignin.

23. The process of claim 14, wherein at least some of said kish has a particle size of less than about 10 micron.

24. The process of claim 14, wherein at least some of said kish has a particle size between about 1 micron and about 10 micron.

25. The process of claim 14, further comprising the step of applying an anti-freeze agent to the kish.

26. The process of claim 14, wherein said bonding agent maintains the kish agglomerated as a clay-like material.

27. A substantially non-dusting kish composition comprising:
   a) kish dust;
   b) a surfactant; and
   c) a bonding agent in an amount by weight between about 1/20,000 and about 1/200 of the weight of the kish dust, wherein said kish dust, surfactant, and bonding agent is agglomerated to provide a clay-like material that is substantially non-dusting.

28. The kish composition according to claim 27, further comprising water in an amount by volume between about 100 and 200 times a volume of the bonding agent.

29. The kish composition of claim 27, wherein the bonding agent is an inorganic bonding agent.

30. The kish composition of claim 29, wherein the inorganic bonding agent is a silicate.

31. The kish composition of claim 29, wherein the inorganic bonding agent is sodium silicate.

32. The kish composition of claim 29, wherein the inorganic bonding agent is bentonite.

33. The kish composition of claim 27, wherein the bonding agent is organic bonding agent.

34. The kish composition of claim 33, wherein the organic bonding agent is lignin.

35. The kish composition of claim 27, further comprising an anti-freeze agent.

* * * * *